3,419,630
PROCESS FOR THE PRODUCTION OF SYMMETRICAL AROMATIC DERIVATIVES OF ETHYLENE

Helmut Mägerlein, Erlenbach am Main, Erhard Siggel, Seckmauern, Hans-Dieter Rupp, Erlenbach am Main, and Gerhard Meyer, Obernburg am Main, Germany, assignors to Glanzstoff A.G., Wuppertal, Germany
No Drawing. Filed Sept. 1, 1966, Ser. No. 576,553
Claims priority, application Germany, Sept. 2, 1965, V 29,248
8 Claims. (Cl. 260—668)

This invention is concerned with a process for the production of an ethylene, i.e. a monoolefin, which has been symmetrically substituted by aromatic radicals, and more particularly the invention is directed to a process carried out in accordance with the following reaction equation:

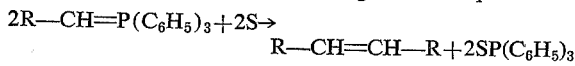

wherein ($C_6H_5$) is phenyl and R represents an aromatic radical, especially phenyl or naphthyl radicals.

It is known that triphenylphosphine-alkylenes can be reacted with oxygen in order to produce a symmetrically substituted ethylene compound with triphenylphosphine oxide being formed as a by-product (Chem. Ber. 96, 1899 (1963)). Although this known process proceeds without serious difficulties on a laboratory scale, it has not been considered to have utility on a commercial scale where very large quantities of the ethylene derivative are to be produced. This lack of utility is partly due to the relatively poor yields of the symmetrically substituted ethylene. In addition, the triphenylphosphine oxide formed in large quantities as a by-product cannot be economically transformed back into the initial phosphine reactant on an industrial or commercial scale except by reactions requiring several complicated and expensive stages.

One object of the present invention is to provide a process for the production of symmetrically substituted aromatic-ethylene compounds which permits one to achieve higher yields on a commercial scale as well as in the laboratory.

Another object of the invention is to provide a process for the production of the desired ethylene derivatives which can be readily adapted to a commercial application while avoiding the difficulties of conventional processes.

These and other objects and advantages of the invention will be more readily understood by one skilled in this art from the following detailed description.

It has now been found, in accordance with the present invention, that the foregoing objects can be achieved by reacting a triphenylphosphine compound of the formula $RCH=P(C_6H_5)_3$, wherein R represents an aromatic radical, with sulfur in an inert organic diluent and under an inert atmosphere at a temperature of about 60° C. to 150° C., preferably in a range of approximately 110–120° C., and then separating the resulting aromatically-substituted ethylene as the desired monoolefin product from the triphenylphosphine sulfide formed as a by-product.

By using sulfur in this reaction, surprisingly better yields of the substituted monoolefin can be achieved than those obtained when using oxygen. Furthermore, the triphenylphosphine sulfide formed as a by-product can be readily converted back into triphenylphosphine in high yields, in contrast to triphenylphosphine oxide, by reaction of the sulfide by-product with inexpensive reducing agents such as sodium and iron.[1] This in iteself is essential for carrying out the production of the aromatically substituted ethylene compounds on a large industrial scale, and the relative ease and lower cost of regenerating triphenylphosphine from its sulfide represents an important technical advantage in going without difficulties from laboratory to commercial production of the aromatic monoolefins.

The reaction of the triphenylphosphine aralkylene compound with sulfur is carried out in the presence of an inert organic diluent, preferably a solvent such as toluene. Suitable diluents or solvents for this purpose include the following: aromatic hydrocarbons such as toluene, xylene, benzene and methylnaphthalene; aliphatic hydrocarbons such as hexene, cyclohexane, heptane, octane, decane and higher homologues; water-free alcohols; dimethylformamide; and similar organic liquids which should be inert under the reaction conditions and which preferably have a boiling point range of about 60 to 200° C. It is also advisable to carry out the reaction of the triphenylphosphine aralkylene compound under an inert atmosphere, e.g. pure nitrogen, because both water and oxygen attack the phosphine compound $RCH=P(C_6H_5)_3$, particularly in the form of the ylide: $R\overline{C}H-\!\!^+\!P(C_6H_5)_3$. The reaction requires about 0.5 to 10 hours depending upon the reaction temperature within the abovenoted range of about 60–150° C.

The preparation of the triphenylphosphine aralkylene employed as the initial reactant is accomplished by conventional methods as described in conjunction with the well known Wittig reaction. For example, triphenylphosphine can first be reacted with an aralkylene halide, preferably benzyl or naphthylmethylene chlorides or bromides, to give the corresponding aralkylphosphonium halide of the formula

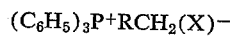

where X represents the halide and R is the aromatic radical. This phosphonium halide is then dehydrohalogenated, preferably in an inert solvent and under an inert atmosphere, by means of a base which is ordinarily an organic lithium compound such as butyllithium or phenyllithium.[1] The same solvents or diluents and inert atmosphere can be used as in the process of the present invention.

The initial reactant obtained in this manner can be set forth as a resonance hybrid of the arylmethylene and the ylide is represented by the formulae

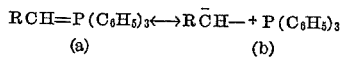

and while it is believed that the reaction of the invention proceeds through the ylide form (b), the arylmethylene form (a) is more generally used throughout this specification and especially in the claims as the most convenient means of identifying the initial reactant. The aromatic radical R may also bear inert substituents, i.e. which are not affected during the reaction, such as lower alkyl, especially methyl and ethyl, or lower alkoxy, especially methoxy, or halogene. These substitutes are most advantageously in para position to the methylene group (—CH=) since this appears to favor the presence of the ylide form of the compound.

Suitable triphenylphosphine aralkylene compounds as initial reactants include the following:

(1) Triphenylphosphine benzylene

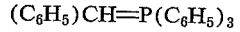

---
[1] Chem. Ber., 92, 2088 (1959); Helv. Chim. Acta, 47, 2137 (1964).

[1] Or an alkoxide of an alkali metal such as sodium methoxide, potassium 6-butoxide, lithium ethoxide.

(2) Triphenylphosphine α-naphthylmethylene

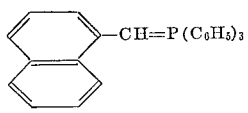

(3) Triphenylphosphine p-methoxybenzylene

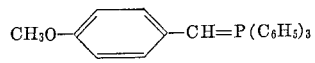

(4) Triphenylphosphine p-methylbenzylene $$(p{=}CH_3{-}C_6H_4)CH{=}P(C_6H_5)_3$$

(5) Triphenylphosphine p-bromobenzylene $$(p{-}Br{-}C_6H_4)CH{=}P(C_6H_5)_3$$

(6) Triphenylphosphine 2.4-diethoxybenzylene

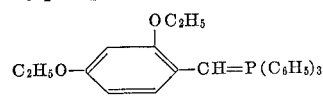

(7) Triphenylphosphine o-chlorobenzylene $$(o{-}Cl{-}C_6H_4)CH{=}P(C_6H_5)_3$$

The invention is further illustrated by the following examples without being restricted to these examples.

EXAMPLE 1

For the production of triphenylphosphine benzylene to be used as the initial reactant, 7.8 grams triphenylbenzylphosphonium chloride and 150 ml. water-free toluene are introduced into a three-necked flask equipped with a dropping funnel, reflux condenser and stirrer and maintained under pure nitrogen. While stirring at room temperature, 1.28 grams of lithium butyl dissolved in 12.8 ml. of toluene are then introduced dropwise into the flask. The resulting orange-red solution of the triphenylphosphine benzylene is further stirred for 30 minutes for completion of the reaction.

The reaction mixture is then heated to 110° C. and 640 mg. sulfur, dissolved in 50 ml. of warmed toluene, is introduced dropwise within 2.5 hours. After completing this addition, the reaction mixture is stirred for a further 4 hours and is then cooled and filtered. The filtrate is evaporated in a vacuum at 40° C. to dryness. The yellow residue obtained thereby (6.7 grams) is fractionally crystallized from hot ethanol, whereby at first 5.2 grams of triphenylphosphine sulfide, 88% of theory, are precipitated in the form of needles with a melting point of 158° C. Then by concentration of the alcoholic solution, there is obtained 1.4 grams trans-stilbene, 72% of theory, with a melting point of 124° C.

EXAMPLE 2

Following the same procedure as used in Example 1, 8.8 grams of (1-naphthylmethyl)-triphenylphosphonium chloride were reacted with 1.28 grams of lithium butyl to obtain the ylide initial reaction which was then reacted at 110° C. with 640 mg. of sulfur. The working up of the reactoin mixture yielded 8.85 grams of a reaction product which was boiled in 150 ml. cyclohexane, whereby di-α-naphthyl stilbene and part of the triphenylphosphine sulfide went into solution. After standing overnight, the sulfide was filtered off to yield 5.7 grams (96% of theory). From the concentrated cyclohexane solution, there was crystallized out 2.6 grams of di-α-naphthylstilbene, corresponding to 92.5% of theory. The melting point of the triphenylphosphine sulfide after crystallization in ethanol was 161° C., and the melting point of the di-α-napthylstilbene was 160° C.

EXAMPLE 3

5.4 grams of p-methoxybenzyltriphenyl phosphonium chloride were reacted, according to the same procedure as described in Example 1, with 0.83 gram of lithium butyl, and the resulting ylide was then reacted with 412 mg. of sulfur. The reaction mixture, while still warm, was separated by filtration from undissolved lithium chloride. The filtrate was permitted to stand overnight at room temperature, and the resulting precipitate amounted to 1.1 grams of di-p-methoxystilbene, representing 71% of theory, in the form of yellowish, sparklng flakes with a melting point of 214° C. Further purification was accomplished by sublimation of this product at 170° C./15 mm. Hg. Evaporation of the mother liquor at 40° C. in a vacuum resulted in 3.7 grams of crude triphenylphosphine sulfide (96% of theory).

EXAMPLE 4

For testing the effect of the reaction temperature on the yields of the aromatically-substituted ethylene and the triphenylphosphine sulfide, the synthesis of the stilbene compound according to Example 1 was carried out at various temperatures. The experimental results are shown in the following summary, using various solvents as well as different temperatures while otherwise employing the same reaction mixture and reaction conditions as were used in Example 1.

TABLE

| ° C. | Percent stilbene | Percent sulfide | Solvent |
|---|---|---|---|
| 60 | 31 | 51 | Benzene. |
| 80 | 44.7 | 61 | Do. |
| 95 | 50 | 66 | Toluene. |
| 110 | 72 | 88 | Do. |
| 125 | 41 | 77 | Xylene. |
| 140 | 28 | 65 | Do. |

The invention is hereby claimed as follows:

1. A process for the production of a symmetrically substituted aromatic monoolefin which comprises: reacting a triphenylphosphine compound of the formula RCH=P(C$_6$H$_5$)$_3$, wherein R represents an aromatic radical, with sulfur in an inert organic diluent and under an inert atmosphere at a temperature of about 60° C. to 150° C., and then separating the resulting aromatically-substituted monoolefin from the triphenylphosphine sulfide formed as a by-product.

2. A process as claimed in claim 1 wherein said reaction is carried out at a temperature between about 110° C. and 120° C.

3. A process as claimed in claim 1 wherein said inert organic diluent is toluene.

4. A process as claimed in claim 1 wherein said triphenylphosphine compound is triphenylphosphine-benzylene.

5. A process as claimed in claim 1 wherein said triphenylphosphine compound is triphenylphosphine-α-naphthylmethylene.

6. A process as claimed in claim 1 wherein said triphenylphosphine compound is triphenylphosphine-p-methoxybenzylene.

7. A process as claimed in claim 1 wherein nitrogen is employed to form said inert atmosphere.

8. A process as claimed in claim 1 wherein the triphenylphosphine sulfide separated as a by-product is subsequently reacted with a reducing agent to reform triphenylphosphine.

References Cited

UNITED STATES PATENTS 3,156,739   11/1964   Horner et al.
3,177,153   4/1965   Pommer et al.

DELBERT E. GANTZ, *Primary Examiner.*

C. R. DAVIS, *Assistant Examiner.*

UNITED STATES PATENT OFFICE
CERTIFICATE OF CORRECTION

Patent No. 3,419,630            December 31, 1968

Helmut Mägerlein et al.

It is certified that error appears in the above identified patent and that said Letters Patent are hereby corrected as shown below:

Column 2, line 14, "hexene" should read -- hexane --; line 72, "6-butoxide" should read -- t-butoxide --.

Signed and sealed this 9th day of June 1970.

(SEAL)
Attest:

Edward M. Fletcher, Jr.
Attesting Officer

WILLIAM E. SCHUYLER, JR.
Commissioner of Patents